United States Patent
Noldus

(10) Patent No.: US 8,019,319 B2
(45) Date of Patent: Sep. 13, 2011

(54) CHARGING OF A SHORT MESSAGE TRANSMISSION

(75) Inventor: Rogier August Noldus, Goirle (NL)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 547 days.

(21) Appl. No.: 11/571,794

(22) PCT Filed: Jul. 10, 2004

(86) PCT No.: PCT/EP2004/007638
§ 371 (c)(1),
(2), (4) Date: Feb. 21, 2007

(87) PCT Pub. No.: WO2006/005357
PCT Pub. Date: Jan. 19, 2006

(65) Prior Publication Data
US 2008/0293386 A1      Nov. 27, 2008

(51) Int. Cl.
*H04B 7/00* (2006.01)
*H04M 11/00* (2006.01)

(52) U.S. Cl. .......... 455/406; 455/408; 455/466

(58) Field of Classification Search .......... 455/461, 455/466, 408, 409, 410; 370/352
See application file for complete search history.

(56) References Cited

U.S. PATENT DOCUMENTS

| | | | |
|---|---|---|---|
| 6,611,516 B1 * | 8/2003 | Pirkola et al. | 370/352 |
| 2004/0243490 A1 * | 12/2004 | Murto et al. | 705/30 |
| 2005/0192035 A1 * | 9/2005 | Jiang | 455/461 |
| 2008/0027839 A1 * | 1/2008 | O'Regan et al. | 705/34 |

FOREIGN PATENT DOCUMENTS

| | | |
|---|---|---|
| EP | 1 418 743 A | 5/2004 |
| EP | 1418743 A1 * | 5/2004 |
| WO | WO 2004017622 A1 * | 2/2004 |

OTHER PUBLICATIONS

"Digital cellular telecommunications system (Phase 2+); Universal Mobile Communication Systems (UMTS); Customised Applications for Mobile network Enhanced Logic (CAMEL); Stage 2 (3GPP TS 23.078 version 5.4.0 Release 5); ETSI TS 123 078" ETSI Standards, vol. 3—CN2, No. V540, Jun. 2003 para 7.5.4.1.2-7.5.4.1.4.*

"Digital Cellular Telecommunication system (Phase 2+); Universal Mobile Communication Systems (UMTS); Customised Applications for Mobile network Enhanced Logic (CAMEL); Stafe 2 (3GPP TS 23.078 version 5.4.0 Release 5); ETSI TS 123 078" ETSI Standards, vol. 3—CN2, No. V540, Jun. 2003 para 7.5.4.1.2-7.5.4.1.4.*

Digital cellular telecommunications system (Phase 2+); Universal Mobile Telecommunications System (UMTS); Customised Applications for Mobile network Enhanced Logic (CAMEL); Stage 2 (3GPP TS 23 078 version 5.4.0 Release 5); ETSI TS 123 078 ETSI Standards, European Telecommunications Standards Institute, Sophia-Antipo, FR. vol. 3-CN2. No. V540. Jun. 2003, XP014007625 Issn: 0000-0001.

* cited by examiner

Primary Examiner — Jinsong Hu
Assistant Examiner — Opiribo Georgewill

(57) ABSTRACT

The invention relates to charging of a short message transmission in a telecommunications network. The invention provides a mechanism for refunding the subscriber for an already charged short message in the event of a failure during the delivery of that short message. The invention also relates to the methods and devices that are used to deliver a short message and perform the charging thereof.

5 Claims, 8 Drawing Sheets

CHARGING OF A SHORT MESSAGE TRANSMISSION

BACKGROUND OF THE INVENTION

1. Technical Field of the Invention

The invention is related to a short message transmission in a telecommunications network.

2. Description of Related Art

In addition to speech connections, telecommunications networks provide data services like short message services (SMS). SMS allows the transmission of alphanumerical short messages of up to 160 ASCII characters from a sender to a receiver.

To enable the transmission of a short message, the telecommunications network comprises a Short Message Service Centre (SMSC) that co-operates with Control Nodes such as the Mobile Services Switching Centre (MSC) or the Serving General Packet Radio System Support Node (SGSN).

The SMSC is a node via which short messages are transmitted and can be stored for later transmission in the case the receiving party is not reached at a first attempt. Short messages are transmitted via one or more MSCs interfacing to the Short Message Service Centre: the SMS Inter-Working MSC (SMS-IWMSC) and the SMS Gateway MSC (SMS-GMSC). The term Inter-Working MSC refers to an MSC submitting mobile originated messages, and correspondingly, the term Gateway MSC refers to an MSC delivering mobile terminating short messages.

In the state of the art, the charging of the transmission of a short message takes place when the short message has successfully arrived at the SMSC. The SMSC signals the successful receipt of the short message to a network node that is responsible for the initiation of the charging procedure. Said network node can be for example an MSC or a Service Control Point. The network node will initiate the creation of a Service Call Detail Record for the short message including a short message identifier and the amount that is charged for the transmission. The Call Detail Records are stored in a Call Detail Record Storage Unit. A Post-Processing Unit collects all Service Call Detail Records and calculates the actual billing of the short message transmission. An example of a possible implementation of the charging procedure is described in the PCT patent application WO03/024135. WO03/024135 relates to a method in a mobile telecommunications network of controlling charging procedures for message services which enable transport of messages from a sender to an SMSC, the method comprising transporting a message from the sender for example via a network node (MSC) to the SMSC, temporarily storing the message at the SMSC, sending a first confirmation acknowledging receipt of the message at an SMSC to the sender, and, if the sender acknowledges receipt of the first confirmation, routing the message from the SMSC to a recipient of the message and initiating a charging procedure for a message.

The method of WO03/024135 has the shortcoming that the charging procedure for the short message is initiated as soon as the reception of the short message by the SMSC has been acknowledged. After the charging procedure has started, the short message is forwarded to the receiving party. However, the delivery of the short message to the receiving party might not be successful. One possible reason for failure of the delivery is that the receiver of the short message has not attached to the telecommunications network within a predefined time, i.e. the validity period of the short message, after the submission of the short message. This leads to the drawback that the subscriber is charged for short messages that cannot be delivered to the receiving party.

SUMMARY OF THE INVENTION

It is an object of the invention to provide a charging mechanism that overcomes the drawbacks of the state of the art.

The invention provides a mechanism to refund the subscriber in the event of a failure during the delivery of the short message. To that end the invention involves the co-operation of a Control Node, a Short Message Service Centre and a Post-Processing Unit. Advantageously the Control Node can be a Mobile Services Switching Centre (MSC) or a Serving General Packet Radio System Support Node (SGSN). The invention relates the costs of a short message transmission that already have been charged to the subscriber, to a particular short message. The relation is established by including a short message identifier in each of the Service Call Detail Records and Delivery Failure Call Detail Records that are related to a short message transmission. The short message identifier is generated by the Control Node, which forwards the short message identifier towards the SMSC. The SMSC includes the short message identifier in a Delivery Failure Call Detail Record in the event of a failed delivery. Afterwards the SMSC forwards the Delivery Failure Call Detail Record towards the Post-Processing Unit. The Post-Processing Unit queries a Call Detail Record Storage Unit for Service Call Detail Records comprising the same short message identifier as included in the Delivery Failure Call Detail Record. The Post-Processing Unit calculates a refund amount for the failed short message transmission. The calculation is based on the information in the Delivery Failure Call Detail Record and the associated Service Call Detail Record. The invention allows the refund of a charged short message transmission in the event of the failure of the delivery towards the receiving party.

The invention provides a method for refunding the costs of a failed short message transmission to a subscriber in a telecommunications network. The method comprises the steps of receiving a short message at a Control Node, the Control Node generating the short message identifier associated to the short message, the Control Node forwarding the short message to a Short Message Service Centre, a Call Detail Record Storage Unit receiving a Service Call Data Record, the Call Detail Record Storage Unit forwarding a Service Call Data Record to a Post-Processing Unit, the Short Message Service Centre forwarding the short message towards a receiving entity, the Short Message Service Centre detecting the failure of the delivery of the short message, the Short Message Service Centre generating a Delivery Failure Call Detail Record in the event of the failure of the delivery of the short message, the Short Message Service Centre forwarding the Delivery Failure Call Detail Record to the Post-Processing Unit, the Control Node forwarding the short message identifier to a Short Message Service Centre, the Short Message Service Centre including the short message identifier in the Delivery Failure Call Detail Record, the Post-Processing Unit calculating a refund amount for the failed short message transmission based on information in the Delivery Failure Call Detail Record and the Service Call Detail Record, and the Post-Processing Unit initiating the refund of the calculated refund amount to the subscriber, wherein the Delivery Failure Call Detail Record and the Service Call Detail Record comprise the short message identifier associated to the failed short message transmission.

In an embodiment of the invention, the refund is implemented by initiating an Account Management Unit to increment an account associated to the subscriber with the calculated refund amount.

In a further embodiment of the invention, the refund is implemented by initiating the correction of a bill associated to the subscriber in accordance with the calculated refund amount.

The invention further provides a method implemented in a Control Node. The Control Node performs the steps of receiving a short message, generating a short message identifier associated to the short message, forwarding the short message, and forwarding the short message identifier to a Short Message Service Centre.

The invention further provides a method implemented in a Short Message Service Centre. The Short Message Service Centre performs the steps of receiving a short message, forwarding the short message towards the receiving entity, detecting the failure of the delivery of the short message, generating a Delivery Failure Call Detail Record, forwarding the Delivery Failure Call Detail Record, receiving a short message identifier associated to the short message from a Control Node, and including the short message identifier in the Delivery Failure Call Detail Record.

The invention further provides a method implemented in a Post-Processing Unit. The Post-Processing Unit performs the steps of receiving a Delivery Failure Call Detail Record from a Short Message Service Centre, receiving a Service Call Detail Record from a Call Detail Record Storage Unit, calculating a refund amount for the failed short message transmission based on the information in the Delivery Failure Call Detail Record and the Service Call Detail Record and initiating the refund of the calculated refund amount to the subscriber, wherein the Delivery Failure Call Detail Record and the Service Call Detail Record comprise a short message identifier associated to the failed short message transmission.

In an embodiment of the invention, the Control Node is a Mobile Services Switching Centre or a Serving General Packet Radio System Support Node.

In a further embodiment of the invention, the receiving entity is a Service Node or a subscriber.

The invention further provides a Control Node for a telecommunications network. The Control Node comprises an input unit for receiving a short message, a processing unit for controlling further units, an identifier generating unit for generating a short message identifier associated to the short message and an output unit for forwarding the short message. The processing unit is arranged to initiate the output unit to forward the short message identifier to a Short Message Service Centre.

The invention further provides a Short Message Service Centre for a telecommunications network. The Short Message Service Centre comprises an input unit for receiving a short message, a processing unit for controlling further units, a call detail record generating unit for generating a Delivery Failure Call Detail Record, an output unit for forwarding the short message and for forwarding the Delivery Failure Call Detail Record and detecting means for detecting the failure of the delivery of the short message and informing the processing unit thereof. The input unit is arranged to receive a short message identifier from a Control Node. The processing unit is arranged to initiate the call detail record generating unit to include the short message identifier in the Delivery Failure Call Detail Record.

In an embodiment of the invention the Control Node is a Mobile Services Switching Centre or a Serving General Packet Radio System Support Node.

The invention further provides a Post-Processing Unit for a telecommunications network. The Post-Processing Unit comprises an input unit for receiving a Delivery Failure Call Detail Record and for receiving a Service Call Detail Record, a processing unit for controlling further units and an output unit for forwarding messages. The processing unit is arranged to calculate a refund amount for a failed short message transmission to a subscriber based on information in the Delivery Failure Call Detail Record and the Service Call Detail Record. The processing unit is further arranged to initiate the refund of the calculated refund amount to the subscriber.

BRIEF DESCRIPTION OF THE DRAWINGS

In the following the invention will be described by way of figures and embodiments with reference to the attached drawings, in which.

DETAILED DESCRIPTION OF THE INVENTION

Figure 1:
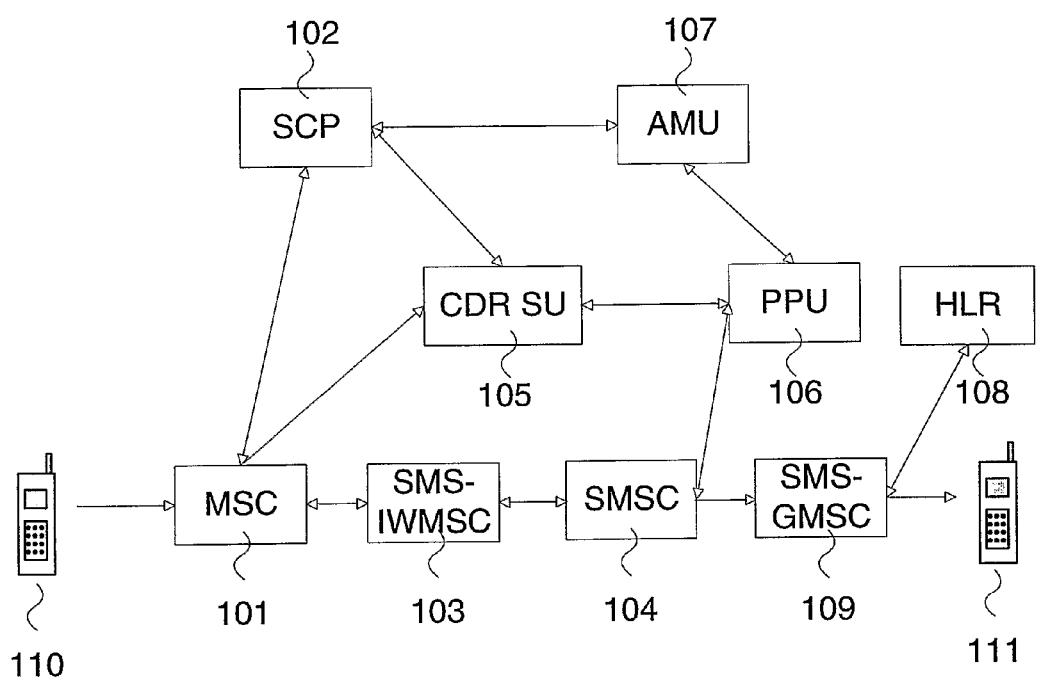
FIG. 1 shows a schematic overview of the components of a telecommunications system according to an embodiment of the invention.

The present invention can be implemented in any mobile telecommunications network providing a short message service. In the following description of preferred embodiments with reference to FIG. 1, the invention is set forth with respect to a mobile telecommunications network with Mobile Services Switching Centre-switched SMS capabilities and optionally, with a prepaid service running in a Service Node 102, such as a Service Control Point (SCP). The invention may also be implemented for post-paid subscribers. The differences in handling the charging of a short message transmission between pre-paid and post-paid subscribers will be mentioned where applicable. A Mobile Services Switching Centre 101 receives a short message transmitted by a sending party 110. For pre-paid subscribers the Mobile Services Switching Centre 101 invokes the prepaid service. The service logic of the prepaid service takes care of the proper charging of the short message transmission to the account of the subscriber to be charged. The account information is stored in an Account Management Unit 107, such as a Service Data Point or another suitable database arranged to retrieve and update account information. For billing purposes in the case of a pre-paid subscriber a Service Node 102 sends charging information to a Call Detail Record Storage Unit 105 where Call Detail Records are stored and can be retrieved for further processing by a Post-Processing Unit 106. For post-paid subscribers the Mobile Services Switching Centre 101 generates a Service Call Detail Record and sends it to the Call Detail Record Storage Unit 105. A Short Message Service Centre (SMSC) 104 is a node via which short messages are transmitted and can be stored for later transmission in the case the receiving party is not reached at a first attempt. Short messages are transmitted via one or more MSCs interfacing to the Short Message Service Centre: in the present embodiment an SMS Inter-Working MSC (SMS-IWMSC) 103 and an SMS Gateway MSC (SMS-GMSC) 109. The term Inter-Working MSC refers to an MSC submitting mobile originated messages, and correspondingly, the term Gateway MSC refers to an MSC delivering mobile terminating short messages. The SMS-IWMSC 103 may be physically integrated with the SMSC or with the MSC for the sending party. The SMS-GMSC 109 receives short messages from the SMSC, interrogates a Home Location Register (HLR) 108 of a receiving party 111 for routing information to deliver each short message and forwards each short message to the serving MSC (not depicted) for delivery to the receiving party 111. The SMS-GMSC 109 may be physically integrated with the SMSC or with the MSC for the receiving party.

Figure 2:
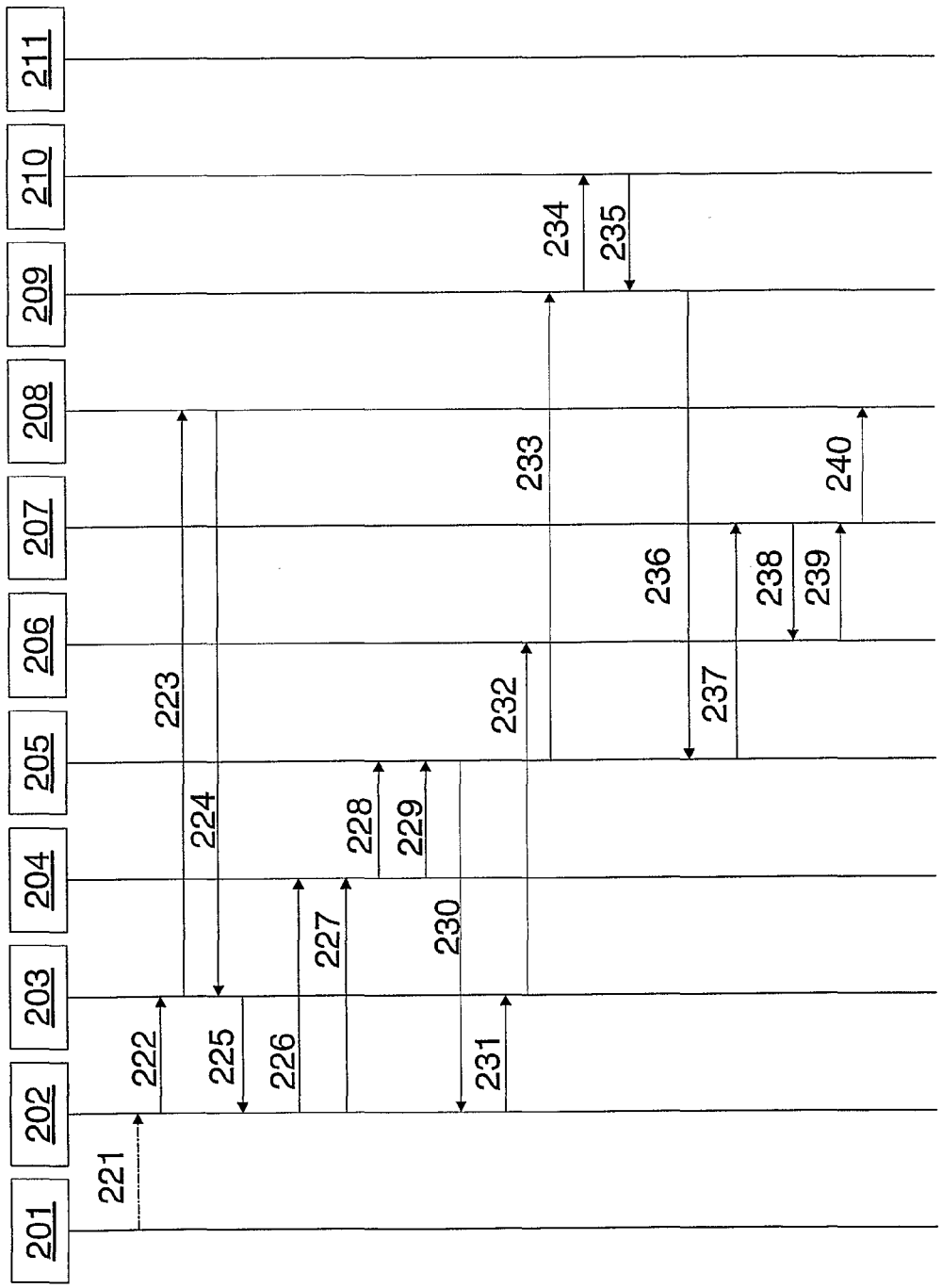
FIG. 2 shows a sequence diagram illustrating a possible sequence of steps for a short message transmission according to the invention.

FIG. 2 shows a failed short message transmission for which a number of steps are carried out in order to refund the costs for the transmission according to the invention. Sender 201 submits a short message in a step 221 to Control Node 202. The short message comprises an identification of the sending party and the receiving party. The Control Node 202 generates a short message identifier associated to the short message. Steps 222 to 225 are applicable to pre-paid subscribers. In a step 222 the Control Node 202 invokes a prepaid service by sending a message to a Service Node 203. The message comprises the short message identifier and the identification of the sending and the receiving party. The Service Node 203 interrogates an Account Management Unit 208 in a step 223 to check the balance of the account and reserves funds for the transmission of the short message. The Account Management Unit 208 responds in a step 224 confirming that. The account could belong either to the sender or the receiver of the short message or even a third party. The Service Node 203 sends an instruction to the Control Node 202 in a step 225 to continue the transmission of the short message. The Control Node 202 forwards the short message in a step 226 and the short message identifier in a step 227 to a Short Message Service Inter-Working MSC (SMS-IWMSC) 204. In an embodiment of the invention steps 226 and 227 are implemented as a single step. The SMS-IWMSC 204 forwards the short message in a step 228 and the short message identifier in a step 229 to a serving Short Message Service Centre 205, preferably steps 228 and 229 are implemented as a single step. The Short Message Service Centre 205 receives the short message and the short message identifier and confirms to the Control Node 202 in a step 230 that the short message was accepted. For pre-paid subscribers the Control Node 202 signals to the Service Node 203 the successful submission of the short message to the Short Message Service Centre in a step 231. Steps 230 and 231 are optional steps. For pre-paid subscribers the Service Node 203 instructs the Account Management Unit 208 to decrement the account of the subscriber with an appropriate amount for the short message transmission, not depicted, and in a step 232 instructs a Call Detail Record Storage Unit 206 to create a Service Call Detail Record comprising the charged amount and the short message identifier. For post-paid subscribers the Control Node 202 creates the Service Call Detail Record comprising the charged amount and the short message identifier, not depicted. The Short Message Service Centre 205 forwards the short message to a Short Message Service Gateway MSC (SMS-GMSC) 209 in a step 233. The SMS-GMSC 209 forwards the short message in a step 234 to the Control Node 210 serving the receiving party 211. In this embodiment the Control Node 210 detects that the short message cannot be delivered to the receiver 211, e.g. the terminal of the receiving party is detached from the telecommunications network, and signals the failure to the SMS-GMSC 209 in a step 235. The SMS-GMSC forwards the information to the Short Message Service Centre 205 in a step 236. The Short Message Service Centre 205 repeatedly attempts a subsequent delivery of the short message towards the receiving party, not depicted, until the validity period of the short message expires and then produces a Delivery Failure Call Detail Record comprising the short message identifier and forwards the record in a step 237 to a Post-Processing Unit 207. The Post-Processing Unit 207 requests the Call Detail Record Storage Unit 206 to send the Service Call Detail Record corresponding to the transmission in a step 238; and the Call Detail Record Storage Unit 206 sends the corresponding Service Call Detail Record in a step 239. The Post-Processing Unit 207 calculates the amount to be refunded based on the contents of the matching Delivery Failure Call Detail Record and Service Call Detail Record. For pre-paid subscribers the Post-Processing Unit 207 instructs the Account Management Unit 208 to increment the subscriber account with the refund amount in a step 240. For post-paid subscribers the Post-Processing Unit 207 initiates the correction of a bill associated to the subscriber in accordance with the calculated refund amount, not depicted.

Figure 3:
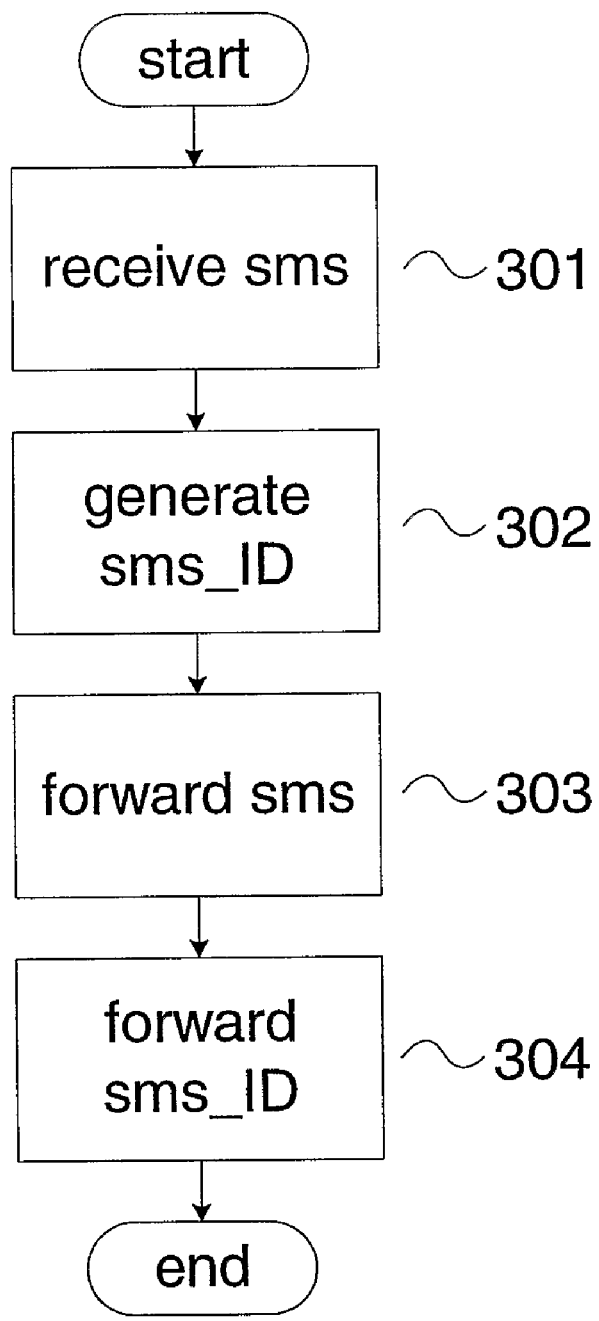
FIG. 3 shows a flow diagram illustrating a sequence of process steps according to the invention as performed by a Control Node.

FIG. 3 depicts a possible sequence of steps performed by a Control Node when processing the transmission of a short message according to the invention. After the submission of a short message by a Sender in a telecommunications network the Control Node receives the short message in a step 301. In a step 302 the Control Node generates a short message identifier associated to the short message, which identifies the short message. The short message identifier preferably consists of the address of the Control Node accompanied by a unique short message reference number. The mechanism of generating a short message reference number is a standard mechanism, which has been specified for example in 3GPP TS 23.078, V3.18.0 (3GPP Release 99, publication date 2003-09-29). The Control Node forwards the Short Message in a step 303 and the Short Message Identifier in a step 304 towards the Short Message Service Centre. It is possible to send both the short message and the short message identifier in a single message, for example a Mobile Application Part (MAP) message.

Figure 4:
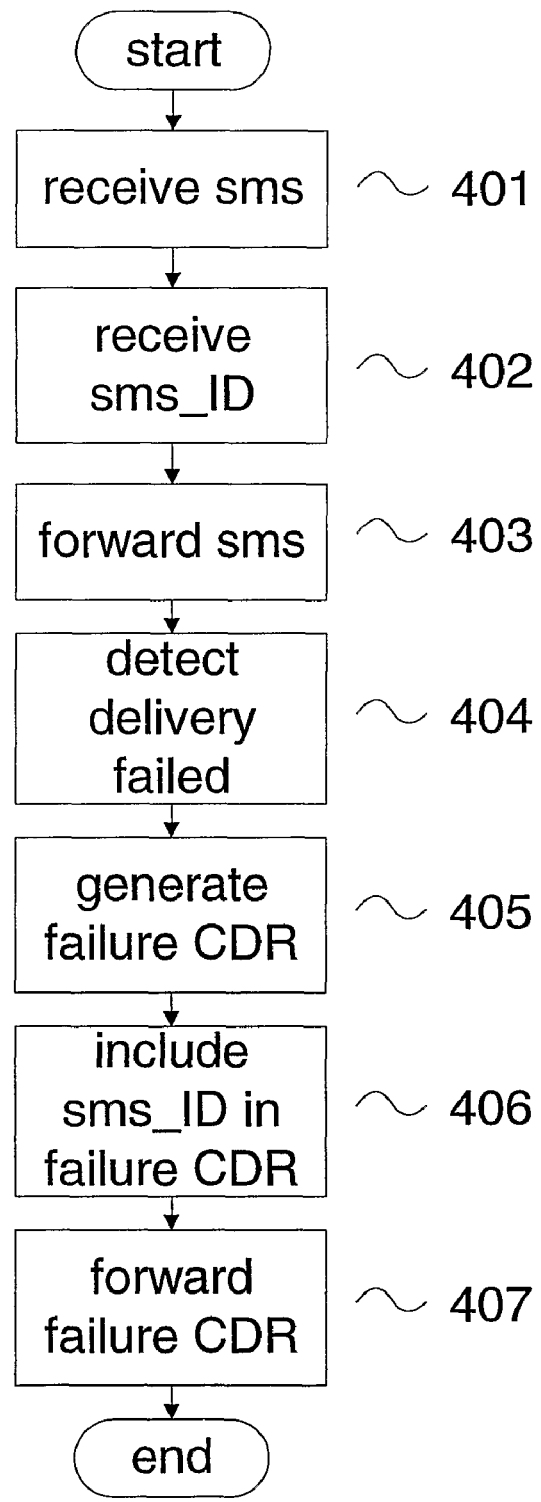
FIG. 4 shows a flow diagram illustrating a sequence of process steps according to the invention as performed by a Short Message Service Centre.

FIG. 4 depicts a possible sequence of steps performed by a Short Message Service Centre when processing the transmission of a short message according to the invention. After the Control Node has forwarded the short message and the short message identifier, the Short Message Service Centre receives the short message in a step 401 and the short message identifier in a step 402. As said for FIG. 3, it is possible to receive both the short message and the short message identifier in a single message, for example a Mobile Application Part (MAP) message. In a step 403 the Short Message Service Centre forwards the short message towards the receiving entity. In a step 404 the Short Message Service Centre receives a message from an SMS-GMSC indicating that the transmission towards the receiving entity failed. The Short Message Service Centre repeatedly attempts a subsequent delivery of the short message towards the receiving party until the validity period of the short message expires. Alternatively, the Short Message Service Centre requests a Home Location Register to notify the Short Message Service Centre when the receiving entity becomes available for receiving the short message. When the validity period of the short message expires before successful delivery, the Short Message Service Centre produces a Call Detail Record indicative of the failed delivery of the short message, the so-called Delivery Failure Call Detail Record, in a step 405. According to the invention the Short Message Service Centre includes the previously received short message identifier in the Delivery Failure Call Detail Record in a step 406 and forwards the Delivery Failure Call Detail Record towards a Post-Processing Unit in a step 407.

Figure 5:
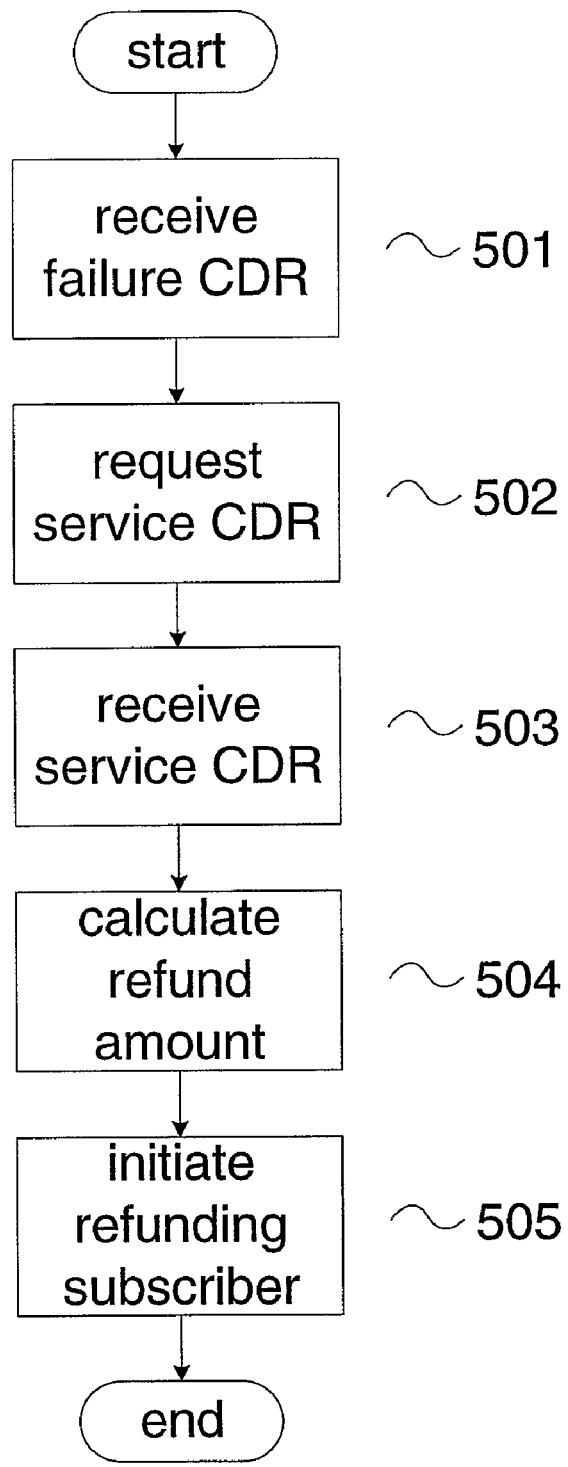
FIG. 5 shows a flow diagram illustrating a sequence of process steps according to the invention as performed by a Post-Processing Unit.

FIG. 5 depicts a possible sequence of steps performed by a Post-Processing Unit for refunding the costs of a failed transmission of a short message according to the invention. The Post-Processing Unit receives the Delivery Failure Call Detail Record in a step 501. In a step 502 the Post-Processing Unit requests the Call Detail Record Storage Unit to transmit the corresponding Service Call Detail Record, i.e. the Service Call Detail Record that includes a short message identifier identical to the short message identifier received in the Delivery Failure Call Detail Record in step 501. The Service Call Detail Record indicates among others the amount that has been charged already to the account of the subscriber paying for the short message transmission. The Post-processing Unit receives the Service Call Detail Record in a step 503. When the Post-Processing Unit obtains the Service Call Detail Record, it calculates in a step 504 how much of the charged amount is to be refunded. The amount to be refunded preferably depends on other parameters given in the Service Call Detail Record. For example such parameters may indicate that the total of the charged amount is to be refunded, or as another example only a part, say 90 percent, of it. In a step 505 the Post-Processing Unit initiates the refund of the subscriber with the calculated refund amount. For pre-paid subscribers the Post-Processing Unit sends an instruction to increment the subscriber account together with the resulting refund amount to the Account Management Unit. For post-paid subscribers the Post-Processing Unit initiates the correction of a bill associated to the subscriber in accordance with the calculated refund amount.

Figure 6:
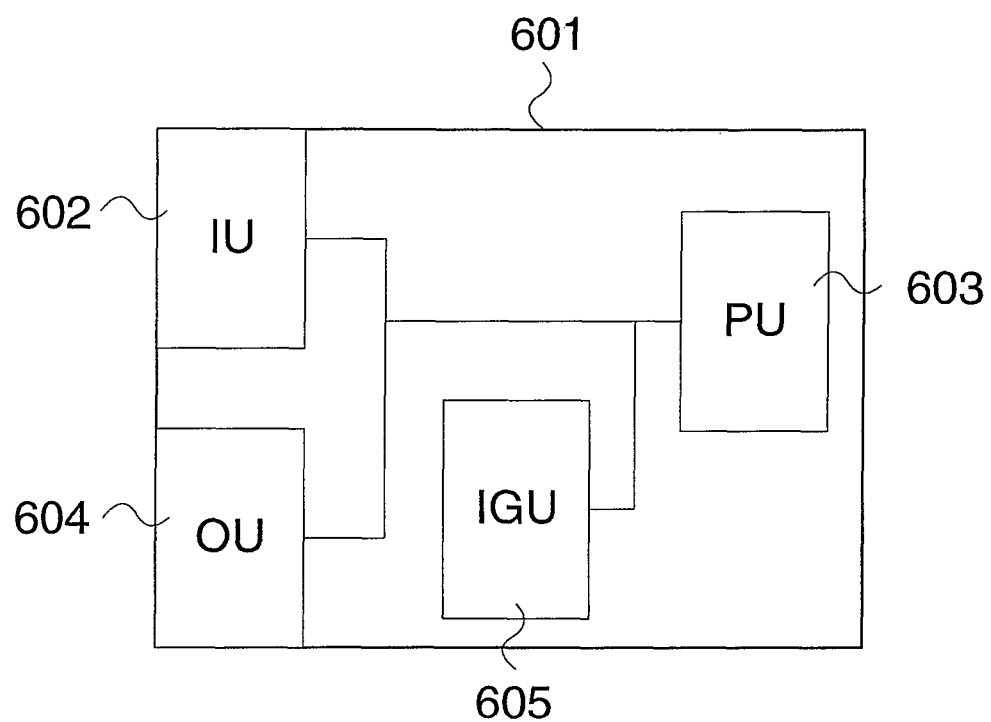
FIG. 6 shows a Control Node for use within a telecommunications network according to the invention.

In FIG. 6 a Control Node 601 according to an embodiment of the invention is depicted. The Control Node 601 comprises an input unit 602 for receiving short messages, a processing unit 603 for controlling further units, an output unit 604 for sending messages and an identifier generating unit 605 for generating a short message identifier. The units 602 to 605 can be implemented in hardware or software or a combination of both. The input unit 602 receives a short message. The processing unit 603 instructs the identifier generating unit 605 to generate a short message identifier associated to the short message and instructs the output unit 604 to send the short message identifier and the short message to a Short Message Service Centre. The identifier generating unit 605 generates a short message identifier. The output unit 604 sends the short message and the short message identifier to the Short Message Service Centre.

Figure 7:
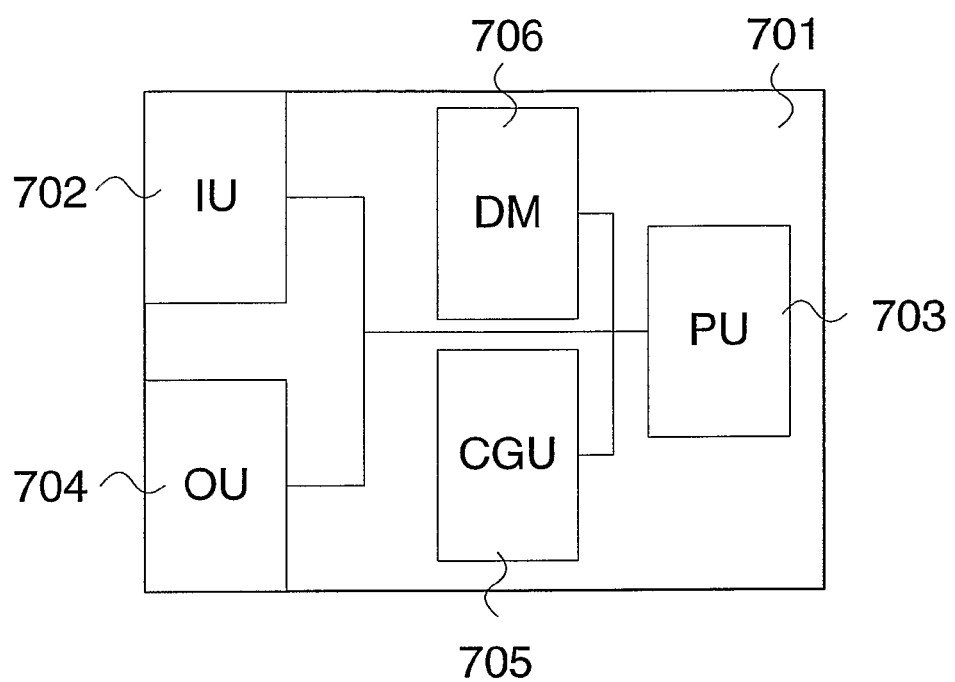
FIG. 7 shows a Short Message Service Centre for use within a telecommunications network according to the invention.

In FIG. 7 a Short Message Service Centre 701 according to an embodiment of the invention is depicted. The Short Message Service Centre 701 comprises an input unit 702 for receiving messages, a processing unit 703 for controlling further units, an output unit 704 for sending messages, a Call Detail Record generating unit 705 for generating Call Detail Records and detecting means 706 for detecting the failure of the delivery of a short message. The units 702 to 706 can be implemented in hardware or software or a combination of both. According to the invention the input unit 702 is adapted to receive the short message identifier from a Control Node. The output unit is arranged to send the short message towards a receiving entity. The detecting means 706 is arranged to detect a delivery failure, e.g. by receiving a failure message. The processing unit 703 is arranged to initiate to initiate a reattempt of the transmission as explained in the description of FIG. 4. The processing unit 703 is arranged to instruct the Call Detail Record generating unit 705 to create a Delivery Failure Call Detail Record comprising the short message identifier and to instruct the output unit 704 to send the Delivery Failure Call Detail Record to a Post-Processing Unit. The Call Detail Record generating unit 705 is arranged to create a Delivery Failure Call Detail Record comprising the short message identifier. The output unit 704 is arranged to send the Delivery Failure Call Detail Record to the Post-Processing Unit.

Figure 8:
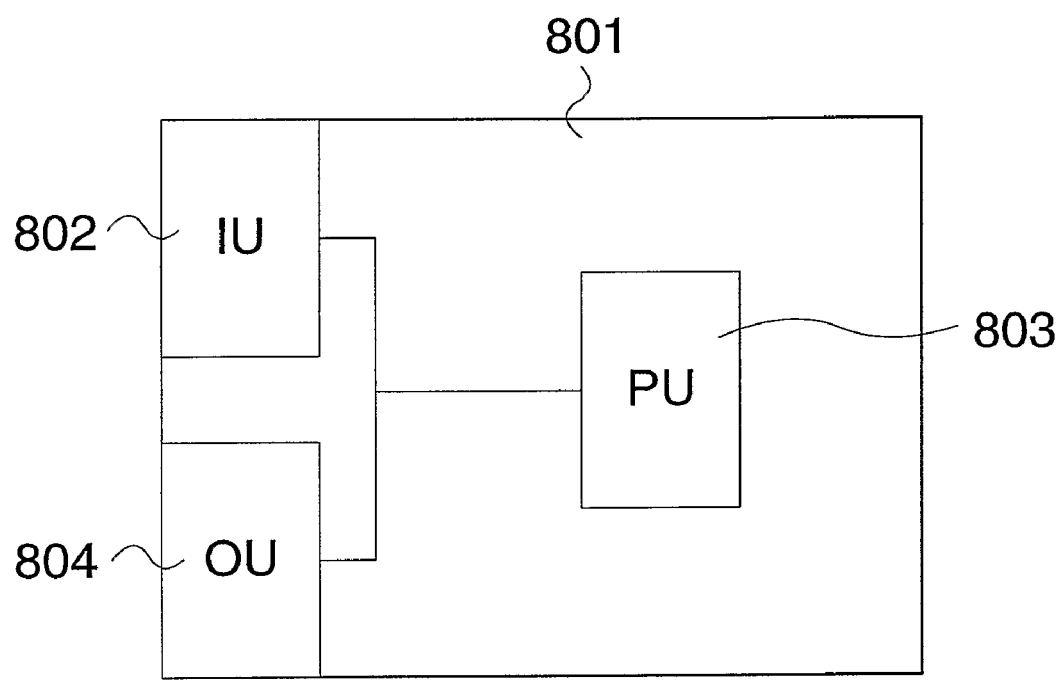
FIG. 8 shows a Post-Processing Unit for use within a telecommunications network according to the invention.
Figure 2:
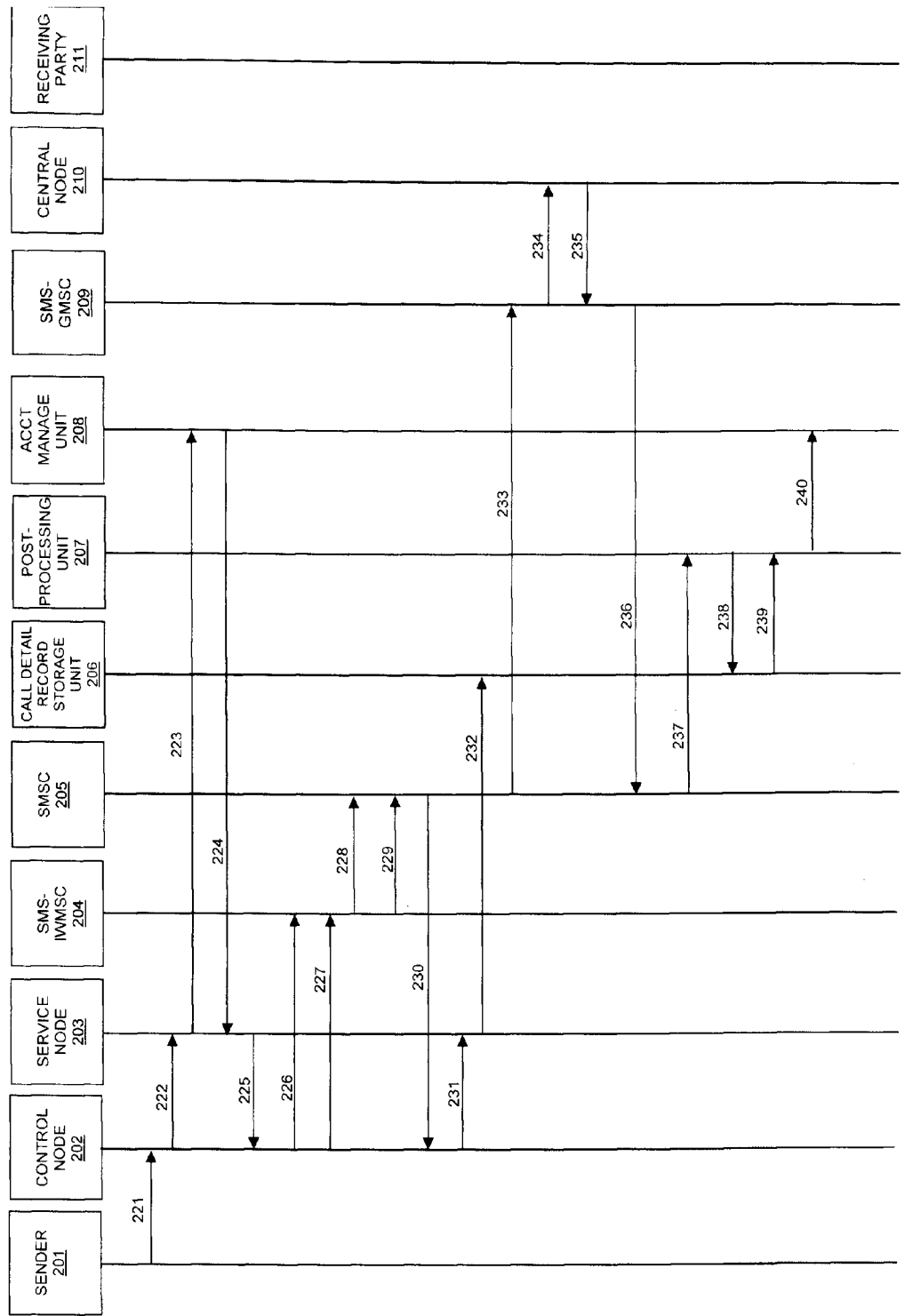

In FIG. 8 a Post-Processing Unit 801 according to an embodiment of the invention is depicted. The Post-Processing Unit 801 comprises an input unit 802 for receiving Service Call Detail Records and for receiving Delivery Failure Call Detail Records, a processing unit 803 for controlling further units and an output unit 804 for sending messages. The units 802 to 804 can be implemented in hardware or software or a combination of both. According to an embodiment of the invention, the input unit 802 receives a Delivery Failure Call Detail Record comprising a short message identifier. The processing unit 803 requests a Call Detail Record Storage Unit to send a Service Call Detail Record corresponding to the Delivery Failure Call Detail Record, i.e. comprising an identical short message identifier. The input unit 802 receives the Service Call Detail Record. The processing unit calculates a refund amount based on the contents of the corresponding Service Call Detail Record and the Delivery Failure Call Detail Record. For pre-paid subscribers the processing unit 803 instructs an Account Management Unit to increment a subscriber account with the refund amount. For post-paid subscribers the processing unit 803 initiates the correction of a bill associated to the subscriber in accordance with the calculated refund amount.

The invention claimed is:

1. A method for refunding the costs of a failed short message transmission to a subscriber in a telecommunications network, the method comprising the steps of:
receiving a short message at a Control Node;
the Control Node generating a short message identifier associated to the short message;
the Control Node forwarding the short message to a Short Message Service Centre;
a Call Detail Record Storage Unit receiving a Service Call Detail Record;
the Call Detail Record Storage Unit forwarding the Service Call Detail Record to a Post-Processing Unit;
the Short Message Service Centre forwarding the short message towards a receiving entity;
the Short Message Service Centre detecting the failure of the delivery of the short message, wherein
a control node serving the receiving entity sends a message to a Short Message Service Gateway MSC (SMS-GMSC) indicating that the short message cannot be delivered to the receiving entity;
the Short Message Service Centre generating a Delivery Failure Call Detail Record in the event of the failure of the delivery of the short message, in response to determining a validity period of the short message has expired; and in response to the generation of the Delivery Failure Call Detail Record, the Short Message Service Centre forwarding the Delivery Failure Call Detail Record to the Post-Processing Unit wherein the Delivery Failure Call Detail Record and the Service Call Detail Record comprise the short message identifier associated to the failed short message transmission, the Service Call Detail Record further comprising a charged amount for the short message transmission, the method further comprising:

the Control Node forwarding the short message identifier to the Short Message Service Centre;

the Short Message Service Centre including the short message identifier in the Delivery Failure Call Detail Record;

the Post-Processing Unit calculating a refund amount for the failed short message transmission based on information in the Delivery Failure Call Detail Record and the Service Call Detail Record; and the Post-Processing Unit initiating the refund of the calculated refund amount to the subscriber.

2. The method as claimed in claim 1, wherein the step of initiating the refund of the calculated refund amount to the subscriber comprises the step of initiating an Account Management Unit to increment an account associated to the subscriber with the calculated refund amount.

3. The method as claimed in claim 1, wherein the step of initiating the refund of the calculated refund amount to the subscriber comprises the step of initiating the correction of a bill associated to the subscriber in accordance with the calculated refund amount.

4. The method as claimed in claim 1, wherein the Control Node is a Mobile Services Switching Centre or a Serving General Packet Radio System Support Node.

5. The method as claimed in claim 1, wherein the receiving entity is a Service Node or a subscriber.

* * * * *

UNITED STATES PATENT AND TRADEMARK OFFICE
CERTIFICATE OF CORRECTION

| | |
|---|---|
| PATENT NO. | : 8,019,319 B2 |
| APPLICATION NO. | : 11/571794 |
| DATED | : September 13, 2011 |
| INVENTOR(S) | : Noldus |

It is certified that error appears in the above-identified patent and that said Letters Patent is hereby corrected as shown below:

In the drawings, Fig 2, should be replaced with the corrected Fig 2, as shown on the attached page.

Signed and Sealed this
Twenty-fourth Day of April, 2012

David J. Kappos
*Director of the United States Patent and Trademark Office*